United States Patent
Takahashi et al.

(10) Patent No.: US 8,537,434 B2
(45) Date of Patent: Sep. 17, 2013

(54) IMAGE READING DEVICE AND IMAGE FORMING APPARATUS

(75) Inventors: Kaoru Takahashi, Kanagawa (JP); Shusaku Yokota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 398 days.

(21) Appl. No.: 12/726,395

(22) Filed: Mar. 18, 2010

(65) Prior Publication Data

US 2011/0013235 A1 Jan. 20, 2011

(30) Foreign Application Priority Data

Jul. 17, 2009 (JP) ................................. 2009-169532

(51) Int. Cl.
| | |
|---|---|
| H04N 1/04 | (2006.01) |
| H04N 1/40 | (2006.01) |
| H04N 1/024 | (2006.01) |
| H04N 1/46 | (2006.01) |
| G06K 1/00 | (2006.01) |
| G06K 7/00 | (2006.01) |
| F21V 7/04 | (2006.01) |

(52) U.S. Cl.
USPC ........... 358/475; 358/445; 358/497; 358/446; 358/1.4; 358/494; 358/474; 358/509; 358/486; 358/471; 358/473; 358/514; 362/612; 382/312

(58) Field of Classification Search
USPC .................. 358/475, 445, 497, 1.4, 494, 474; 362/612; 382/312
See application file for complete search history.

(56) References Cited

U.S. PATENT DOCUMENTS

| | | | |
|---|---|---|---|
| 6,061,479 A * | 5/2000 | Ishikawa et al. .............. | 382/312 |
| 7,446,909 B2 | 11/2008 | Hashizume | |
| 7,609,421 B2 | 10/2009 | Lee | |
| 7,855,815 B2 | 12/2010 | Hayashide et al. | |
| 8,035,868 B2 | 10/2011 | Kaneko | |
| 2005/0088705 A1 | 4/2005 | Okamoto et al. | |
| 2005/0088707 A1 | 4/2005 | Sakurai et al. | |
| 2005/0135840 A1 | 6/2005 | Sakurai et al. | |
| 2006/0187500 A1 | 8/2006 | Sakurai | |
| 2008/0174835 A1* | 7/2008 | Lee .............................. | 358/497 |
| 2009/0034024 A1* | 2/2009 | Kim et al. ..................... | 358/475 |
| 2009/0310193 A1* | 12/2009 | Endo et al. .................... | 358/474 |
| 2011/0013234 A1 | 1/2011 | Takahashi et al. | |

FOREIGN PATENT DOCUMENTS

| | | |
|---|---|---|
| JP | H04-129378 A | 4/1992 |
| JP | 2002-247297 A | 8/2002 |
| JP | 2002-290675 A | 10/2002 |
| JP | 2004-361425 A | 12/2004 |

(Continued)

OTHER PUBLICATIONS

Australian Office Action dated Feb. 7, 2011 for corresponding Australian patent application No. 2010201056.

(Continued)

Primary Examiner — Charlotte M Baker
Assistant Examiner — Rury Grisham
(74) Attorney, Agent, or Firm — Sughrue Mion, PLLC

(57) ABSTRACT

An image reading device includes: a plurality of light sources that are arranged in a row and emit light; a light guide body that guides the light emitted from the plurality of light sources to a reading portion and transmits light reflected from the reading portion; a carriage having the plurality of light sources and the light guide body; and a reading unit that receives the light reflected from the reading portion and reads an image on the reading portion.

6 Claims, 11 Drawing Sheets

(56) References Cited

FOREIGN PATENT DOCUMENTS

| | | |
|---|---|---|
| JP | 2005084373 A | 3/2005 |
| JP | 2005-252646 A | 9/2005 |
| JP | 2006041600 A | 2/2006 |
| JP | 2006-189537 A | 7/2006 |
| JP | 2007-214923 A | 8/2007 |
| JP | 2007-288716 A | 11/2007 |
| JP | 2009-9144 A | 1/2009 |
| JP | 2009-010830 A | 1/2009 |

OTHER PUBLICATIONS

U.S. Office Action issued in U.S. Appl. No. 12/726,383 dated Apr. 6, 2012.
Communication from Japanese Patent Office dated Jul. 3, 2012, issued in Japanese Patent Application 2009-168167.
Office Action dated Mar. 5, 2013, issued in Japanese Patent Application No. 2009-169532.
Notice of Reasons for Rejection dated Jun. 4, 2013, issued in Japanese Patent Application No. 2009- 169532.

* cited by examiner

FIRST COMPARATIVE EXAMPLE

PRESENT EXEMPLARY EMBODIMENT

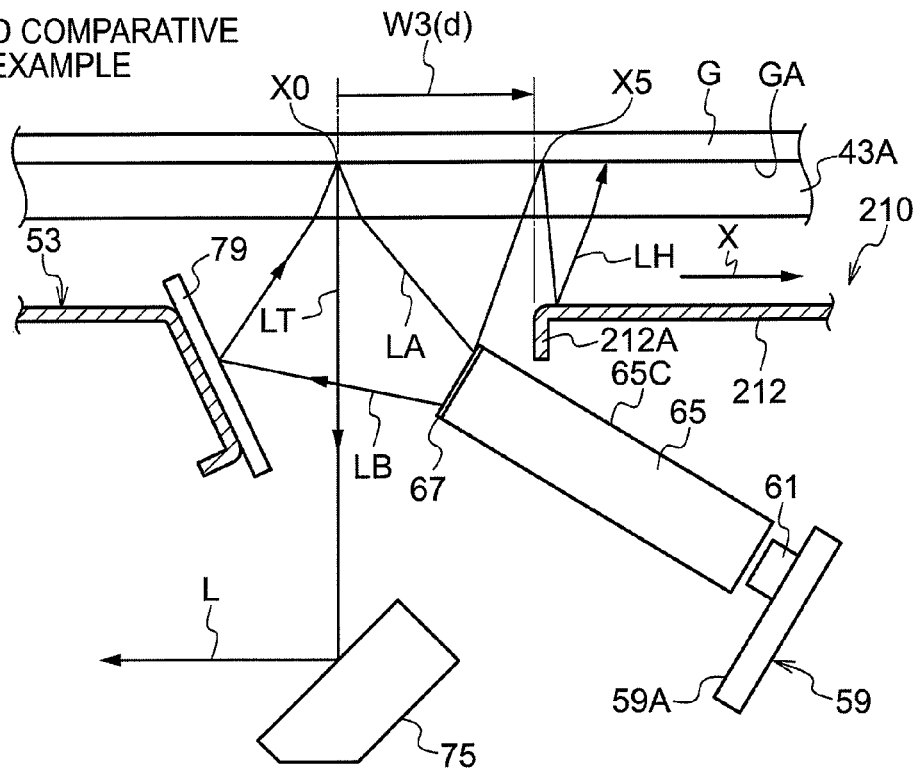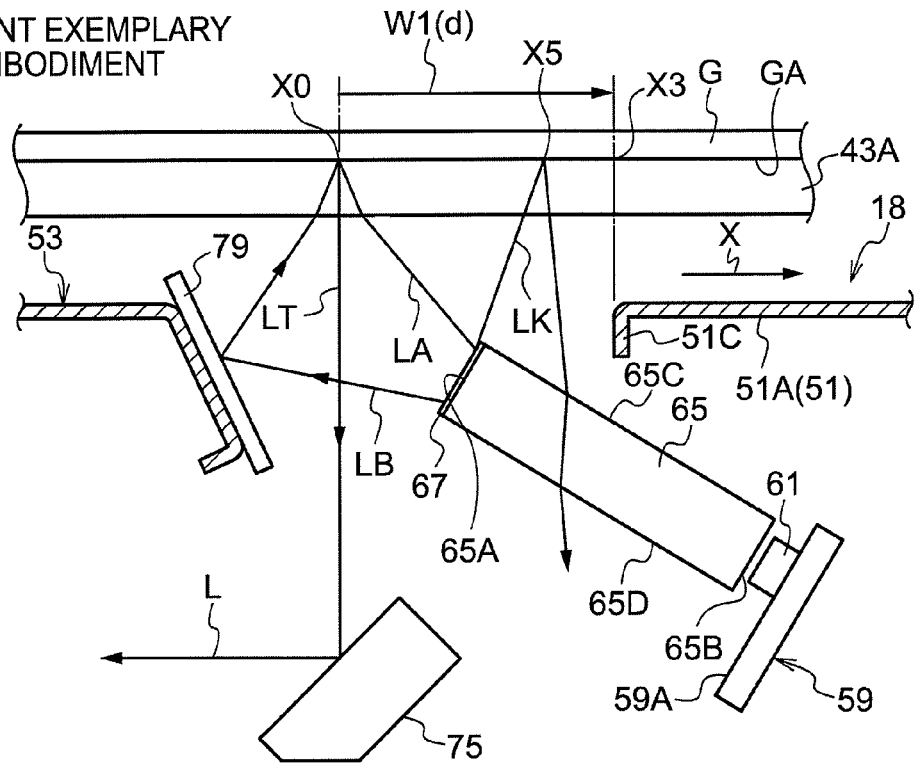

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2009-169532 filed on Jul. 17, 2009.

BACKGROUND

Technical Field

The present invention relates to an image reading device and an image forming apparatus.

SUMMARY

An image reading device pertaining to a first aspect of the present invention includes: a plurality of light sources that are arranged in a row and emit light; a light guide body that guides the light emitted from the plurality of light sources to a reading portion and transmits light reflected from the reading portion; a carriage having the plurality of light sources and the light guide body; and a reading unit that receives the light reflected from the reading portion and reads an image on the reading portion.

BRIEF DESCRIPTION OF THE DRAWINGS

Exemplary embodiments of the present invention will be described in detail based on the following figures, wherein:

FIG. 10A is a schematic diagram showing a state of light travel in a main portion of a document reading device of a second comparative example, and FIG. 10B is a schematic diagram showing a state of light travel in the main portion of the document reading device pertaining to the exemplary embodiment of the present invention.

DETAILED DESCRIPTION

First, one example of an image reading device and an image forming apparatus pertaining to an exemplary embodiment of the present invention will be described.

(Overall Configuration)

Figure 1:
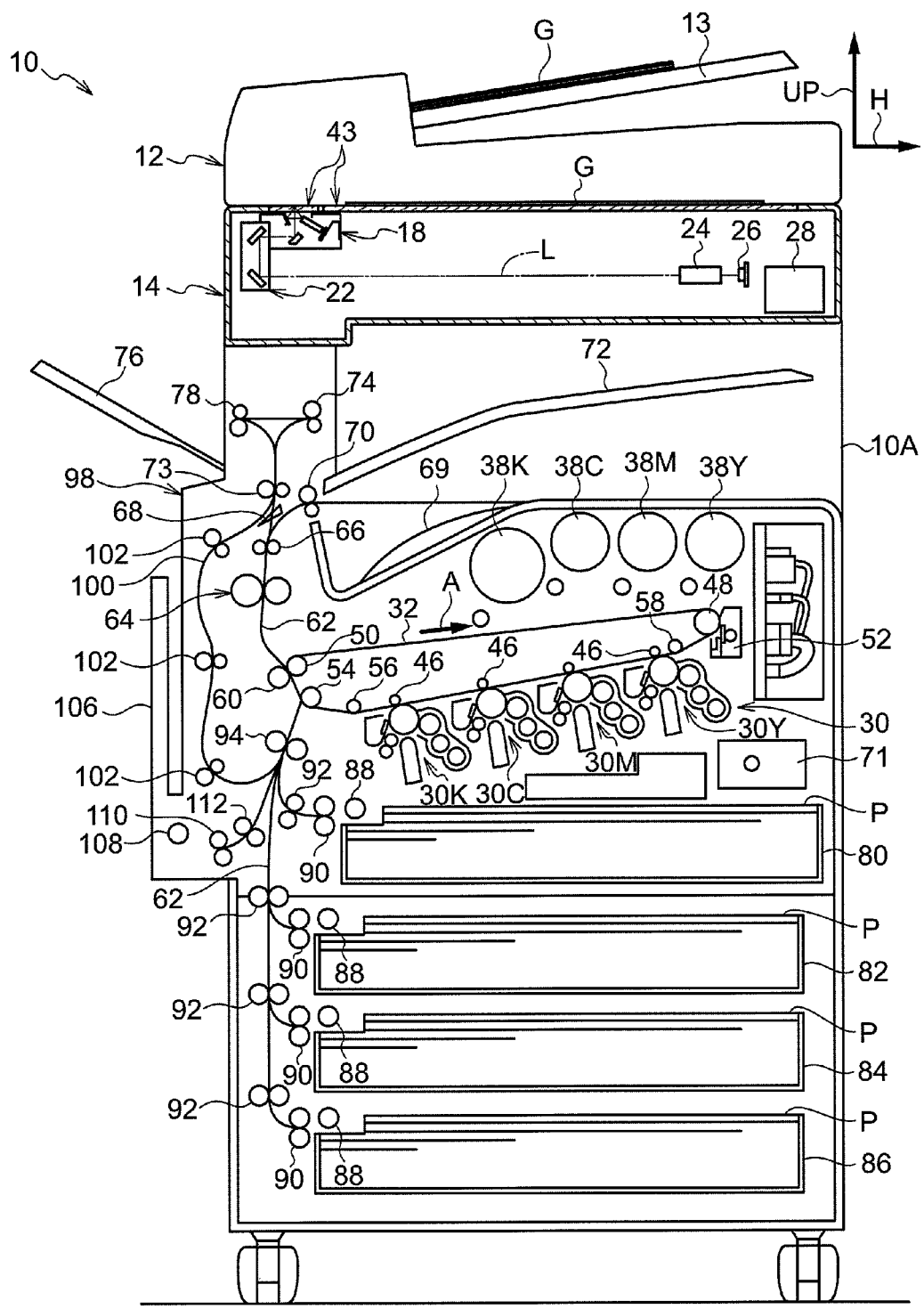
FIG. 1 is an overall diagram of an image forming apparatus pertaining to an exemplary embodiment of the present invention.

As shown in FIG. 1, in the upper portion of an apparatus body 10A of an image forming apparatus 10 pertaining to the exemplary embodiment of the present invention, there are disposed an automatic document feeding device 12 that automatically conveys plural reading documents G one sheet at a time, a platen glass 43 on which one of the reading documents G is placed, and a document reading device 14 that serves as one example of an image reading device that reads a reading portion, i.e., surface-to-be-read GA (see FIGS. 6 and 7) of a reading document G that has been fed by the automatic document feeding device 12 or placed on the platen glass 43. Further, in the central portion of the device body 10A, there is disposed a control component 71 that controls the operation of each portion of the image forming apparatus 10. Arrow UP shown in the drawing represents up in a vertical direction and arrow H represents a horizontal direction.

On the vertical direction central side of the device body 10A, there are disposed plural image forming units 30 that form toner images of mutually different colors. Moreover, on the upper side of the image forming units 30, there is disposed an endless intermediate transfer belt 32 onto which the toner images that have been formed by the image forming units 30 of each color are transferred while the intermediate transfer belt 32 is circularly driven in the direction of arrow A shown in the drawing. The image forming units 30 correspond to one example of an image forming component.

As the image forming units 30, four image forming units 30Y, 30M, 30C and 30K are disposed in correspondence to each color of yellow (Y), magenta (M), cyan (C) and black (K) toner, and the image forming units 30Y, 30M, 30C and 30K are arranged in a slanted state with respect to the horizontal direction (the direction of arrow H) such that the position of the image forming unit 30Y where the yellow (Y) toner image that is transferred onto the intermediate transfer belt 32 first is formed is high and such that the position of the image forming unit 30K where the black (K) toner image that is transferred onto the intermediate transfer belt 32 last is formed is low.

These four image forming units 30Y, 30M, 30C and 30K are basically configured by the same members. In the description below, the letters (Y, M, C and K) corresponding to each color will be added to the reference numerals when it is necessary to distinguish between each color, and the letters corresponding to each color will be omitted when it is not particularly necessary to distinguish between each color.

Figure 2:
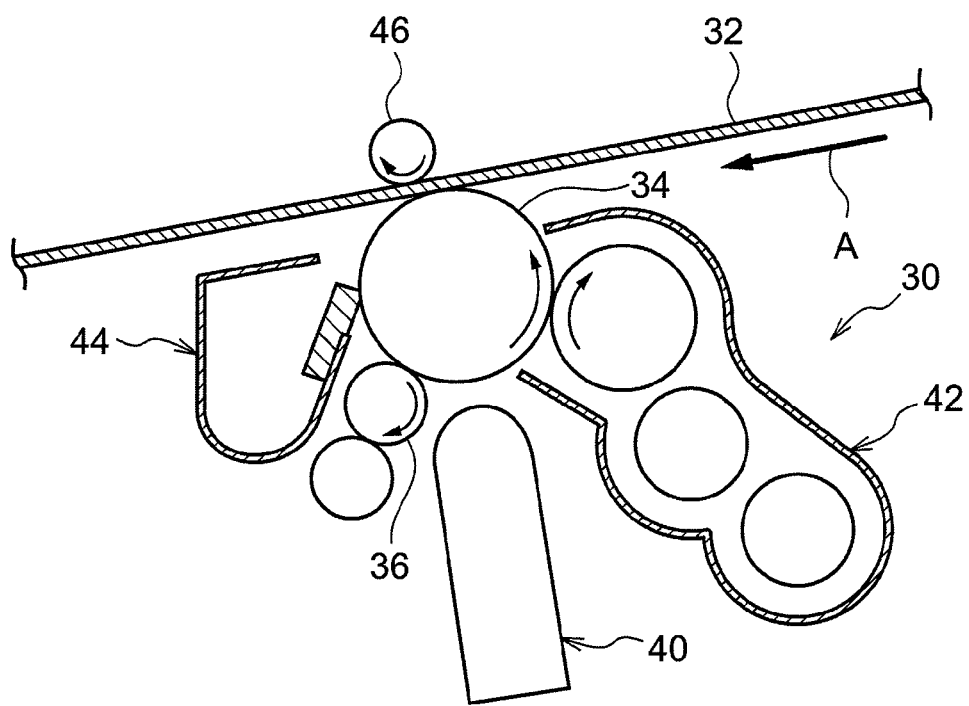
FIG. 2 is a configuration diagram of an image forming unit pertaining to the exemplary embodiment of the present invention.

As shown in FIG. 2, in the image forming unit 30 of each color, there is disposed an image holding member (image carrier) 34 that is rotated by an unillustrated drive device, and moreover there is disposed a charge member 36 for primary charging that charges the surface of this image holding member 34.

Further, on the downstream side of the charge member 36 in the direction of rotation of the image holding member 34, there is disposed an exposure device 40 that exposes the surface of the image holding member 34 whose surface has been charged by the charge member 36 to light corresponding to each color to thereby form an electrostatic latent image, and on the downstream side of the exposure device 40 in the direction of rotation of the image holding member 34, there is disposed a developing device 42 that develops, with toner of each color, the electrostatic latent image that has been formed on the surface of the image holding member 34 to thereby visualize the electrostatic latent image as a toner image.

As shown in FIG. 1, above the intermediate transfer belt 32, there are disposed toner cartridges 38Y, 38M, 38C and 38K that supply toner of each color to the developing devices 42 of each color of yellow (Y), magenta (M), cyan (C) and black (K). Additionally, the toner cartridge 38K that houses the black (K) color toner is large in comparison to the toner cartridges 38Y, 38M and 38C of the other colors in accordance with its frequency of use.

As shown in FIG. 2, on the opposite side of the image holding member 34 across the intermediate transfer belt 32, there is disposed a primary transfer member 46 for transferring the toner image that has been formed on the surface of the image holding member 34 onto the intermediate transfer belt 32. Moreover, a cleaning device 44 that cleans residual toner and the like that remains on the surface of the image holding member 34 without being transferred from the image holding member 34 onto the intermediate transfer belt 32 is disposed in contact with the surface of the image holding member 34 on the downstream side of the primary transfer member 46 in the direction of rotation of the image holding member 34.

According to this configuration, image data of each color are sequentially outputted to the exposure devices 40 (Y, M, C and K) that are disposed individually in the image forming units 30 (Y, M, C and K) of each color of yellow (Y), magenta (M), cyan (C) and black (K). Moreover, the surfaces of the corresponding image holding members 34 are exposed to light that has been emitted in accordance with the image data from these exposure devices 40 (Y, M, C and K), whereby electrostatic latent images are formed on the surfaces of the image holding members 34. The electrostatic latent images that have been formed on the surfaces of the image holding members 34 are developed by the developing devices 42 (Y, M, C and K) respectively as toner images of each color of yellow (Y), magenta (M), cyan (C) and black (K).

Moreover, the toner images of each color of yellow (Y), magenta (M), cyan (C) and black (K) that have been sequentially formed on the surfaces of the image holding members 34 are multiply-transferred by the primary transfer members 46 onto the intermediate transfer belt 32 that is placed such that it slants above the image forming units 30 (Y, M, C and K) of each color.

Here, as shown in FIG. 1, the intermediate transfer belt 32 is wrapped with a predetermined tension around a drive roll 48 that applies drive force to the intermediate transfer belt 32, a support roll 50 that rotates and supports the intermediate transfer belt 32 from its undersurface, a tension applying roll 54 that applies tension to the intermediate transfer belt 32, a first driven roll 56 and a second driven roll 58.

Moreover, a cleaning device 52 that cleans the surface of the intermediate transfer belt 32 is disposed on the opposite side of the drive roll 48 across the intermediate transfer belt 32, and this cleaning device 52 is configured such that it may be freely detached from the device body 10A by opening a front cover (not shown) disposed on the front side (the front side where the user stands) of the device body 10A.

Further, on the end portion on the lower side of the intermediate transfer belt 32, which is placed in a state where it is slanted at a predetermined angle with respect to the horizontal direction (the direction of arrow H), a secondary transfer member 60 for secondarily transferring the toner images that have been primarily transferred onto the intermediate transfer belt 32 onto a recording sheet P that serves as a recording medium is placed so as to sandwich the intermediate transfer belt 32 between itself and the support roll 50. That is, the position sandwiched by the secondary transfer member 60 and the support roll 50 is configured to be a secondary transfer position where the toner images are transferred onto the recording sheet P.

Above the support roll 50 and the secondary transfer member 60, there is disposed a fixing device 64 that fixes the toner images to the recording sheet P to which the toner images have been transferred by the secondary transfer member 60 and which is conveyed along a conveyance path 62. The fixing device 64 is configured by a heat roll that is placed on an image surface side of the recording sheet P and a pressure roll that presses the recording sheet P against the heat roll.

Moreover, on the downstream side of the fixing device 64 in the conveyance direction of the recording sheet P (hereinafter, the downstream side in the conveyance direction of the recording sheet P will simply be called "the conveyance direction downstream side"), there are disposed conveyance rolls 66 that convey the recording sheet P to which the toner images have been fixed, and on the conveyance direction downstream side of the conveyance rolls 66, there is disposed a switch gate 68 that switches the conveyance direction of the recording sheet P. Further, on the conveyance direction downstream side of the switch gate 68, there are disposed first discharge rolls 70 that discharge to a first discharge component 69 the recording sheet P that is guided by the switch gate 68 that has been switched to one direction.

Moreover, on the conveyance direction downstream side of the switch gate 68, there are disposed second discharge rolls 74, which discharge to a second discharge component 72 the recording sheet P that is guided by the switch gate 68 that has been switched to the other direction and is conveyed by conveyance rolls 73, and third discharge rolls 78, which discharge the recording sheet P to a third discharge component 76.

On the upstream side of the secondary transfer member 60 in the conveyance direction of the recording sheet P (hereinafter, the upstream side in the conveyance direction of the recording sheet P will simply be called "the conveyance direction upstream side"), there are disposed paper supply components 80, 82, 84 and 86 in which the recording sheets P are housed, and in each of the paper supply components 80, 82, 84 and 86, there are housed recording sheets P of different sizes.

Moreover, for each of the paper supply components 80, 82, 84 and 86, there is disposed a paper supply roll 88 that takes the housed recording sheets P out from each of the paper supply components 80, 82, 84 and 86 to the conveyance path 62, and on the conveyance direction downstream side of each of the paper supply rolls 88, there are disposed conveyance rolls 90 and conveyance rolls 92 that convey the recording sheets P one sheet at a time. Further, on the conveyance direction downstream side of the conveyance rolls 92, there are disposed position adjusting rolls 94 that temporarily stop the recording sheets P and feed the recording sheets P to the secondary transfer position at a predetermined timing.

A two-side-use conveyance unit 98 that inverts and conveys the recording sheets P in order to form an image on both sides of the recording sheets P is disposed on the side of the secondary transfer position, and in the two-side-use conveyance unit 98, there is disposed an inversion path 100 into which are fed the recording sheets P that are conveyed by reversely rotating the conveyance rolls 73. Additionally, plural conveyance rolls 102 are disposed along the inversion path 100, and the recording sheets P that have been conveyed by these conveyance rolls 102 are again conveyed, in a state where their front and back sides have been inverted, to the position adjusting rolls 94.

Further, next to the two-side-use conveyance unit 98, there is disposed a folding manual paper supply component 106. Additionally, there are disposed a paper supply roll 108 and conveyance rolls 110 and 112 that convey the recording sheets P that are supplied from the folding manual paper supply component 106 that has been opened, and the recording sheets P that have been conveyed by the conveyance rolls 110 and 112 are conveyed to the position adjusting rolls 94.

Next, the configuration of the automatic document feeding device 12 will be described.

Figure 3:
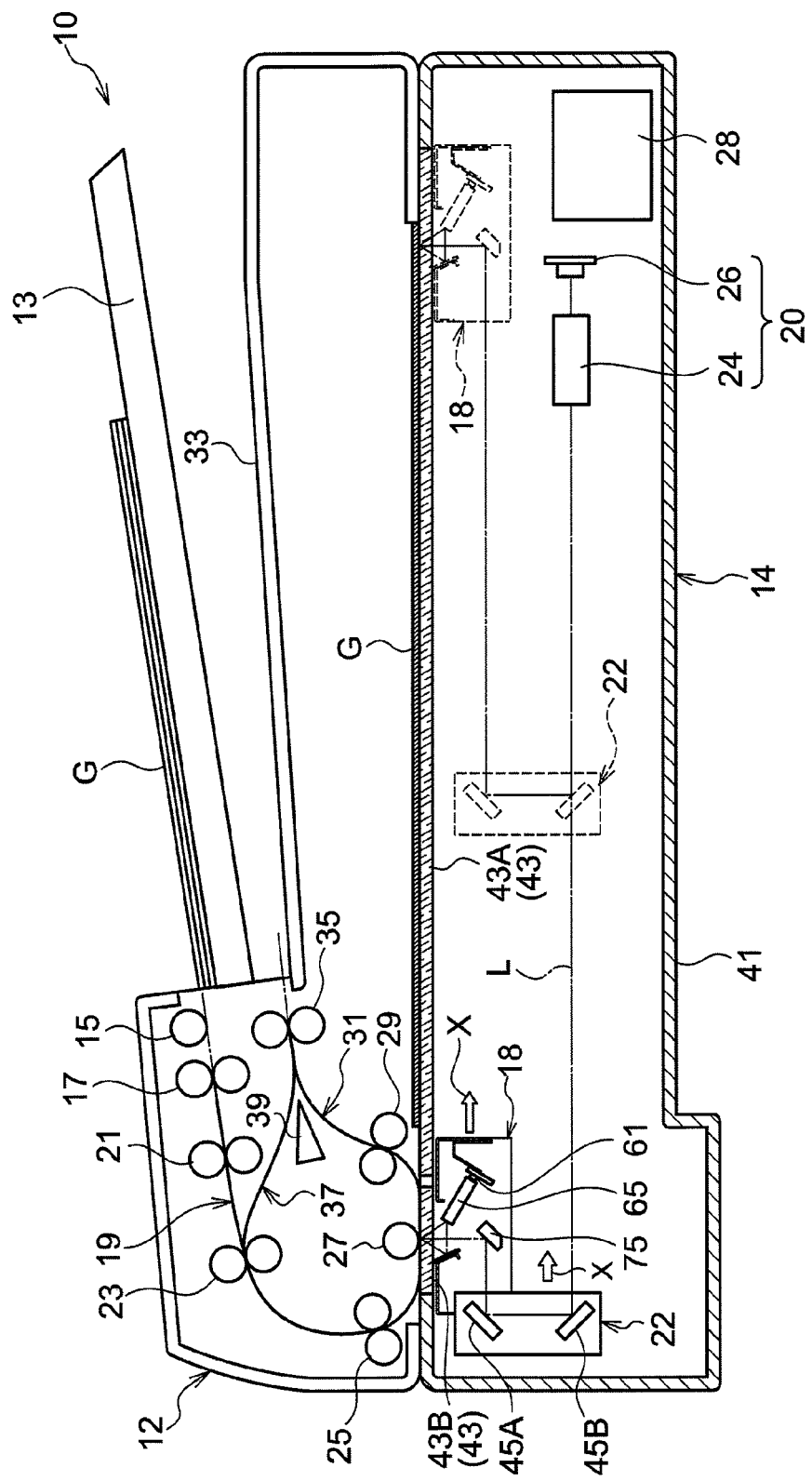
FIG. 3 is a configuration diagram of an automatic document feeding device and a document reading device pertaining to the exemplary embodiment of the present invention.

As shown in FIG. 3, the automatic document feeding device 12 has a document tray 13 on whose upper surface the plural reading documents G are loaded, a feed roll 15 that feeds the reading documents G one sheet at a time from the document tray 13, and first conveyance rolls 17 that convey the reading document G that has been fed by the feed roll 15 further to the downstream side.

Further, the automatic document feeding device 12 has a first conveyance path 19 on which the reading document G that has been fed from the document tray 13 is first conveyed. In the first conveyance path 19, there are disposed second conveyance rolls 21 that convey the reading document G that has been separated one sheet at a time to rolls on the downstream side, third conveyance rolls 23 that convey the reading document G further to rolls on the downstream side and perform loop formation, position adjusting rolls 25 that resume rotation at a reading timing after temporarily stopping and supply the reading document G to the document reading device 14 while administering adjustment of the position of the leading edge of the reading document G, an assist roll 27 that assists the conveyance of the reading document G that is being read, and fourth conveyance rolls 29 that convey the reading document G that has been read further downstream. A guide member that guides the reading document G that is conveyed is disposed in the first conveyance path 19, but illustration thereof is omitted.

On the downstream side of the fourth conveyance rolls 29, there is disposed a second conveyance path 31, and on the downstream side of the second conveyance path 31, there are disposed discharge rolls 35 that discharge the reading document G of which reading has ended to a discharge component 33.

From the downstream side of the second conveyance path 31 toward the third conveyance rolls 23, there is formed a third conveyance path 37 for inverting the reading document G that has gone through the second conveyance path 31. Additionally, at the branching position of the second conveyance path 31 and the third conveyance path 37, there is disposed a switch gate 39 that switches the conveyance path of the reading document G to the second conveyance path 31 or the third conveyance path 37.

Here, the feed roll 15 is configured such that it is raised and lowered by an unillustrated drive device including a motor, so that the feed roll 15 is raised and held in an evacuated position while the image forming apparatus 10 is standing by and so that the feed roll 15 is lowered and conveys the uppermost reading document G on the document tray 13 during conveyance of the reading document G Further, the feed roll 15 and the first conveyance rolls 17 are rotated by linkage of a clutch mechanism (not shown) and perform conveyance of the reading document G.

The first conveyance rolls 17, the second conveyance rolls 21 and the third conveyance rolls 23 cause the leading edge of the reading document G to abut against the stopped position adjusting rolls 25 and form a loop. The position adjusting rolls 25 adjust the position of the leading edge of the reading document G held in the position adjusting rolls 25 during loop formation. Because of this loop formation in the reading document G, the reading timing is adjusted, and misalignment (skew) of the reading document G during reading is suppressed. Additionally, reading of the reading document G is started when the position adjusting rolls 25 that had been stopped start rotating in accordance with the start timing of reading.

The end portion of the switch gate 39 is placed on the upper side when starting reading of one side of the reading document G, and the switch gate 39 is switched such that it discharges the reading document G that has gone through the fourth conveyance rolls 29 to the discharge component 33. When both sides of the reading document G are to be sequentially read, the end portion of the switch gate 39 is lowered such that the switch gate 39 guides the reading document G to the third conveyance path 37 in order to invert the reading document G. Thus, the reading document G is again guided to the first conveyance path 19 via the third conveyance path 37.

Next, the configuration of the document reading device 14 will be described.

In the document reading device 14, the platen glass 43 is attached to the upper portion of a casing 41 that is disposed on the lower portion of the automatic document feeding device 12. The platen glass 43 is configured by a first platen glass 43A on which the reading document G is placed in a stationary state and a second platen glass 43B that forms a light transmitting component for reading the reading document G that is being conveyed.

Further, the document reading device 14 has a first carriage 18 and a second carriage 22. Attached to the first carriage 18 are light emitting elements 61 that emit light in order to read an image of the surface-to-be-read GA (see FIG. 6) of the reading document G, a light guide member 65 that guides the light that has been emitted from the light emitting elements 61 to the surface-to-be-read GA of the reading document G, and a first mirror 75 that reflects the light that has exited from the light guide member 65 and reflected by the surface-to-be-read GA. Attached to the second carriage 22 are a second mirror 45A and a third mirror 45B that guide the light that has been made incident thereon from the first mirror 75 of the first carriage 18 to an imaging component 20. The imaging component 20 corresponds to one example of a reading unit.

The first carriage 18 stops below the second platen glass 43B (below a conveyance surface of the reading document G), which is an initial position, or moves along the surface-to-be-read GA (see FIG. 7) of the reading document G across the entire first platen glass 43A, irradiates the reading document G with light L emitted by the light emitting elements 61, and guides the light L that has been reflected by the reading document G to the second carriage 22. The detailed configuration of the first carriage 18 will be described later.

The second carriage 22 has the second mirror 45A, which reflects downward the light L that has been made incident thereon from the first mirror 75 of the first carriage 18, and the third mirror 45B, which reflects back in the direction of arrow X the light L that has been reflected by the second mirror 45A.

The imaging component 20 has an imaging-use lens 24, which images the light (optical image) that has been reflected back by the third mirror 45B, and a photoelectric conversion element 26, which photoelectrically converts the optical image that has been imaged by the imaging-use lens 24, and the electrical signals (image signals) that have been converted by the photoelectric conversion element 26 are sent to an image processing device 28 that is electrically connected to the photoelectric conversion element 26. In the image processing device 28, the electrical signals are image-processed, and the image-processed image signals are sent to the exposure devices 40 (see FIG. 2) by the aforementioned control component 71.

Here, first, when an image of the reading document G that has been placed on the first platen glass 43A is to be read, the first carriage 18 and the second carriage 22 move in a moving direction (the direction of arrow X) at a moving distance ratio of 2:1. At this time, the surface-to-be-read GA (see FIG. 7) of the reading document G is irradiated with the light L from the light emitting elements 61 of the first carriage 18, the light L that has been reflected by the surface-to-be-read GA is guided to the second carriage 22, and the light L is reflected in the order of the second mirror 45A and the third mirror 45B and is guided to the imaging-use lens 24. Then, the light L that has been guided to the imaging-use lens 24 is imaged on a light receiving surface of the photoelectric conversion element 26. The length of the optical path of the light L from the surface-to-be-read GA of the reading document G to the photoelectric conversion element 26 does not change because the moving distance of the second carriage 22 is half the moving distance of the first carriage 18.

The photoelectric conversion element 26 is a one-dimensional sensor and processes one line's worth of the reading document G in a direction intersecting the moving direction (the direction of arrow X). In the document reading device 14, after reading of one line in the direction intersecting the moving direction has ended, the first carriage 18 is moved in the moving direction to read the next line of the reading document G. Reading of one page ends when this is executed across the entire reading document G. In the description below, the moving direction of the first carriage 18 and the second carriage 22 will be called a slow scanning direction and the direction intersecting the moving direction will be called a fast scanning direction.

When an image of the reading document G is to be read on the second platen glass 43B, the reading document G that is conveyed by the automatic document feeding device 12 passes over the second platen glass 43B. At this time, the first carriage 18 and the second carriage 22 are in a state where they are stopped in the solid-line reading position shown on one end (the left end in FIG. 3) of the document reading device 14. In this reading position, first, the light L that has been reflected by the first line of the conveyed reading document G is imaged by the imaging-use lens 24, and an image is read by the photoelectric conversion element 26. That is, after one line's worth in the fast scanning direction has been processed by the photoelectric conversion element 26 that is a one-dimensional sensor, the next one line in the fast scanning direction of the conveyed reading document G is read. Then, reading of one page of the reading document G across the slow scanning direction ends when the trailing edge of the reading document G passes the reading position of the second platen glass 43B.

(Configuration of Main Portion)

Next, the configuration of the first carriage 18 will be described.

Figure 4:
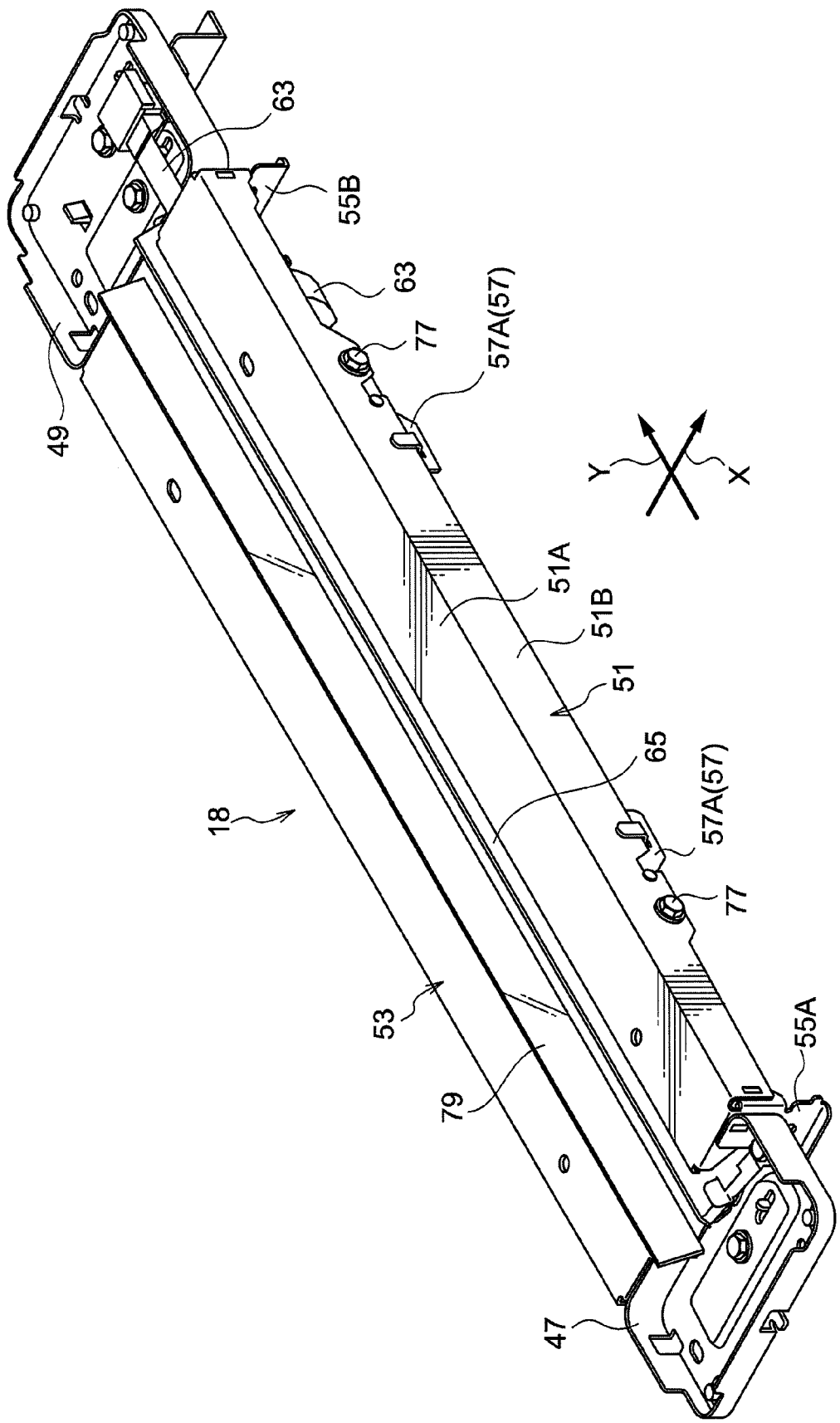
FIG. 4 is a perspective diagram of a main portion of the document reading device pertaining to the exemplary embodiment of the present invention.

As shown in FIG. 4, the first carriage 18 is configured such that both end portions of a first holder 51 and a second holder 53 that are sheet metal whose longitudinal direction coincides with the fast scanning direction and which are placed an interval apart from each other in the slow scanning direction (the direction of arrow X) are attached to the upper portions of two side plates 55A and 55B that are placed opposing each other an interval apart from each other in the fast scanning direction (the direction of arrow Y). Further, a third holder 47 and a fourth holder 49 are attached to the side plates 55A and 55B. Here, the first holder 51 corresponds to one example of an upper member.

The upper surfaces of the first holder 51 and the second holder 53 form the upper surface of the first carriage 18 and are placed opposing the surface-to-be-read GA (see FIG. 6) of the reading document G. The interval at which the side plate 55A and the side plate 55B are placed apart from each other in the fast scanning direction is greater than the width of an image formation area of the reading document G (see FIG. 1) in the fast scanning direction.

The first holder 51 has an L-shaped cross section in the slow scanning direction and is configured by an upper wall 51A that serves as the upper surface of the first carriage 18 and a side wall 51B on the slow scanning direction (the moving direction) front side of the first carriage 18. The end portion of the upper wall 51A is folded downward. Further, planar portions 57A of a bracket 57 whose longitudinal direction coincides with the fast scanning direction and which has an inverted L-shaped cross section in the slow scanning direction are fixed by screws 77 to the lower portion of the side wall 51B on the inner side of the first holder 51.

Figure 5:
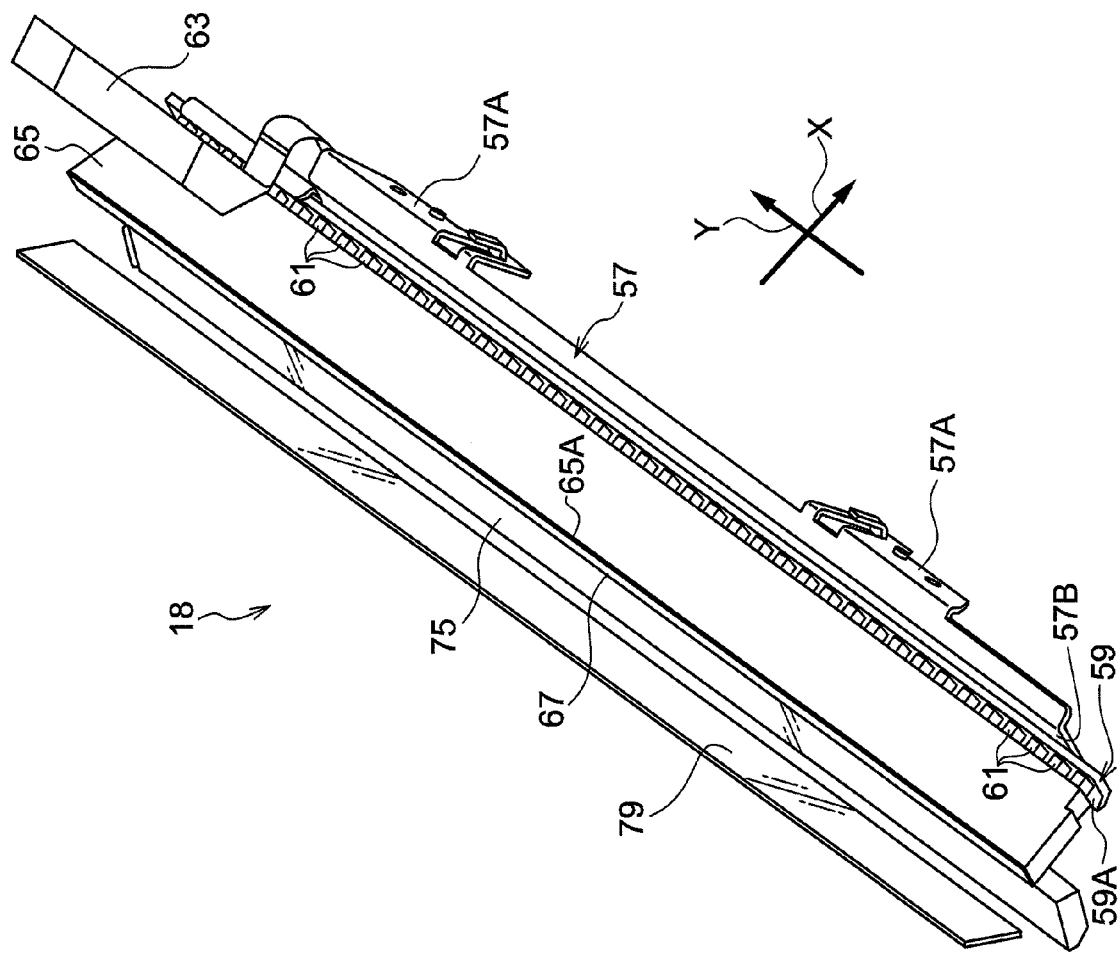
FIG. 5 is a perspective diagram of the inside of the main portion of the document reading device pertaining to the exemplary embodiment of the present invention.

As shown in FIG. 5, a light emitting component 59, which has a circuit board 59A whose longitudinal direction coincides with the fast scanning direction and the plural light emitting elements 61 that are one example of a light source and which are arranged in a row along the fast scanning direction on the circuit board 59A, is attached to another slantingly placed planar portion 57B of the bracket 57. The circuit board 59A is supplied with power from the control component 71 (see FIG. 1) via a flexible substrate 63 that is connected to an end portion of the circuit board 59A. In the present exemplary embodiment, light emitting diode (LED) elements are used as the light emitting elements 61.

Here, a light source drive circuit (not shown) for driving the light emitting component 59 is built into the control component 71 (see FIG. 1) of the image forming apparatus 10. This light source drive circuit is equipped with resistors that adjust the quantity of light with which the reading document G (see FIG. 1) is irradiated from each of the light emitting elements 61. Additionally, the light source drive circuit is configured to drive the light emitting component 59 on the basis of light source drive signals for controlling the switching ON and OFF of light emission of the light emitting elements 61 and adjustment signals for adjusting the quantity of light.

Figure 6:
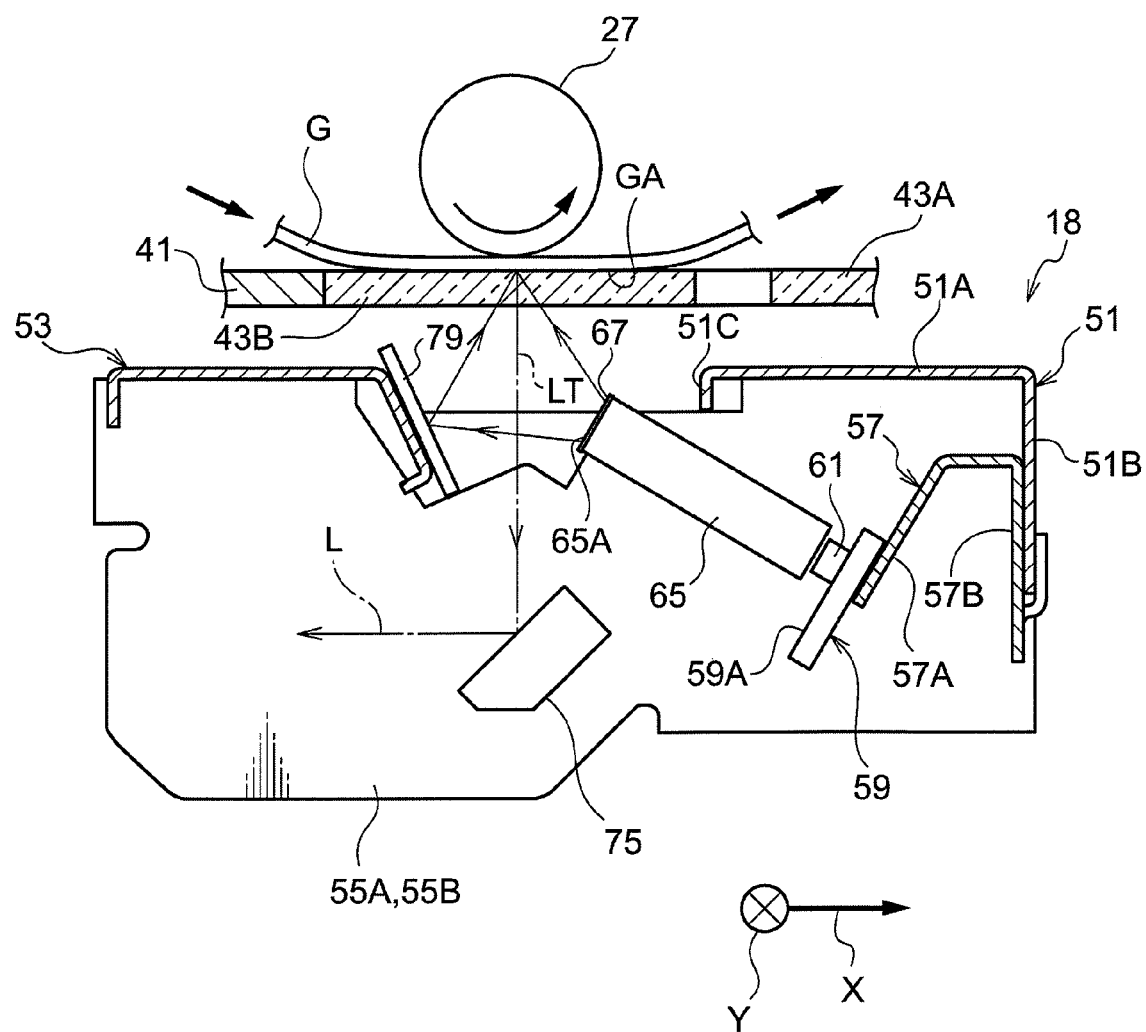
FIG. 6 is a cross-sectional diagram, in a slow scanning direction, of the main portion of the document reading device pertaining to the exemplary embodiment of the present invention.

As shown in FIG. 6, the light emitting elements 61 are placed such that they are slanted at a predetermined angle with respect to the surface-to-be-read GA of the reading document G. Thus, the light that has been emitted from the light emitting elements 61 toward the reading document G is made incident from a predetermined slanting direction with respect to the surface-to-be-read GA of the reading document G and is scattered, so in comparison to when the light is made incident perpendicularly with respect to the surface-to-be-read GA of the reading document G, specular reflection on the background (white) of the reading document G is suppressed and a drop in the luminance differences (contrast) of the image is suppressed.

Further, inside the first carriage 18, there is disposed the light guide member 65 that corresponds to one example of a light guide body that opposes the light emitting surfaces of the light emitting elements 61 and whose longitudinal direction coincides with the fast scanning direction. The light guide member 65 is, as one example, made by molding acrylic resin in a cuboid shape, and both end portions of the light guide member 65 in the fast scanning direction are supported by the side plates 55A and 55B. Further, the light guide member 65 is configured to diffuse directional light at least in the fast scanning direction and to guide the light that has been emitted from the light emitting elements 61 as far as near the reading position of the reading document G (see FIG. 1).

Thus, the light from the light emitting elements 61 of the light emitting component 59 is totally reflected inside the light guide member 65 and exits from a light exiting surface 65A of the light guide member 65 on the opposite side of the surface opposing the light emitting elements 61, and variations in the light quantity distribution in the light exiting surface 65A are suppressed. As other materials of the light guide member 65, there are polycarbonate resin, polyimide resin, glass, etc.

A translucent diffuser plate 67 is joined to the light exiting surface 65A of the light guide member 65. The diffuser plate 67 is configured by acrylic resin as one example, and concavo-convexities (not shown) that diffuse the light made incident thereon from the light exiting surface 65A of the light guide member 65 are formed in the light exiting surface of the diffuser plate 67. By changing the shape of this concavo-convex pattern, the light exiting from the diffuser plate 67 is shaped into a circular shape or an elliptical shape. As other materials of the diffuser plate 67, there are polycarbonate resin, polyester resin, glass, etc.

In a position a predetermined distance away from the diffuser plate 67 in the slow scanning direction, there is placed a reflector plate 79 that reflects the light that has exited from the diffuser plate 67 and guides the light to the reading position (the surface-to-be-read GA) of the reading document G. The reflector plate 79 is a mirror body whose longitudinal direction coincides with the fast scanning direction, and the surface of the reflector plate 79 on the opposite side of the light reflecting surface is fixed to a slanted surface of the second holder 53.

Further, on the lower side of the light guide member 65 and the diffuser plate 67, there is disposed the first mirror 75 that guides the light that has been reflected by the reading document G to the second mirror 45A (see FIG. 3) of the second carriage 22. The first mirror 75 is held as a result of both end portions thereof being inserted into hole portions formed in the side plates 55A and 55B (see FIG. 4).

In the first carriage 18, the light L that has been emitted from the light emitting elements 61 travels through the inside of the light guide member 65 while being totally reflected and is diffused by the diffuser plate 67. Here, assuming that LT represents the optical axis of the light L that is reflected by the surface-to-be-read GA of the reading document G and travels toward the first mirror 75, some of the light L that has been diffused by the diffuser plate 67 passes through the second platen glass 43B such that the reading document G is irradiated therewith from one side of the optical axis LT, and the remainder of the light L is reflected by the reflector plate 79 and thereafter passes through the second platen glass 43B such that the reading document G is irradiated therewith from the other side of the optical axis LT. Then, the light L with which the reading document G has been irradiated is reflected by the surface-to-be-read GA of the reading document G, is thereafter reflected by the first mirror 75, and, as shown in FIG. 3, travels from the second carriage 22 through the imaging lens 24 and is imaged by the photoelectric conversion element 26, whereby reading of image information is performed. In FIG. 6, the optical axis LT corresponds to one example of an optical axis of an optical path that guides the light reflected from the surface-to-be-read GA of the reading document G to the imaging component 20.

Next, the details of the light guide member 65 will be described. In FIG. 7 to FIG. 11, the details of the light guide member 65 will be described by partial diagrams in which illustration of the bracket 57 and the side plate 55A is omitted.

Figure 7A:
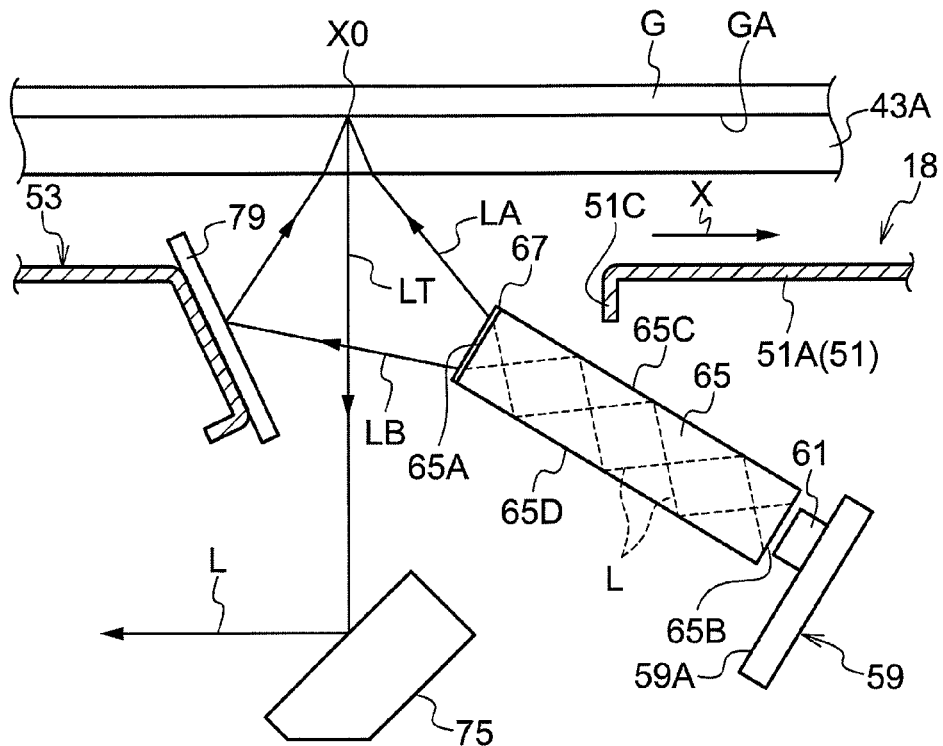
FIG. 7A is a partial cross-sectional diagram of the main portion of the document reading device pertaining to the exemplary embodiment of the present invention.
Figure 7B:
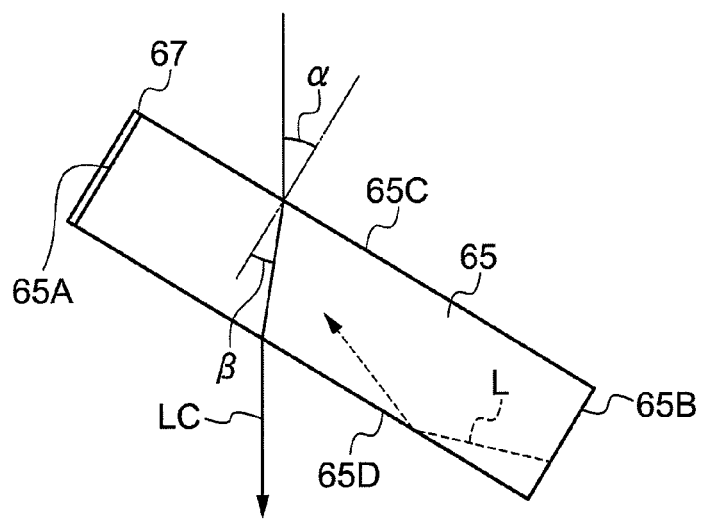
FIG. 7B is a schematic diagram showing a state of light transmittance in a light guide member (optical waveguide) pertaining to the exemplary embodiment of the present invention.

As shown in FIG. 7B, the light guide member 65 has a light entering surface 65B into which the light L from the light emitting elements 61 (see FIG. 7A) enters, the light exiting surface 65A from which the light L exits, an upper surface 65C that is positioned above (on the reading document G side (see FIG. 7A)) in the thickness direction and a lower surface 65D that opposes the upper surface 65C and is positioned below the upper surface 65C. The surface roughness of the upper surface 65C and the lower surface 65D is set beforehand such that the light L is totally reflected, and the entire light guide member 65 is colorless and transparent.

Here, in the present exemplary embodiment, a transparent member is defined as a member whose light transmittance measured by the Plastic-Transparent Material Total Light Transmittance Testing Method (Part One: Single Beam Method) of Japanese Industrial Standards (JIS-K-7361-1: 1997) is equal to or greater than 80%. Although it is desirable for the light guide member 65 to be a transparent member, a member whose light transmittance is equal to or less than 80% may also be used.

Further, it is desirable for the surface roughness of the upper surface 65C and the lower surface 65D of the light guide member 65 to be, as one example, set so as to become equal to or less than 0.1 µm in terms of surface roughness measured by the arithmetic mean roughness Ra of JIS-B-0601. In terms of suppressing re-reflection of the light L back to the reading document G from the upper surface 65C of the light guide member 65, making the surface roughness of the upper surface 65C rougher than 0.1 µm to scatter the light L that is made incident thereon from the outside is also conceivable as one technique, but in this case, it is necessary to set an upper limit of surface roughness because this affects the total reflection inside the light guide member 65. As a method of finishing the light guide member 65 such that it has a surface roughness equal to or less than 0.1 µm, it suffices to use injection molding, for example.

Here, because the light guide member 65 is transparent, as shown in FIG. 7B, in the light guide member 65, light LC that has been made incident at an angle of incidence α (an angle smaller than the critical angle) on the upper surface 65C is refracted at an angle of refraction β in the upper surface 65C, is transmitted through the inside of the light guide member 65, is again refracted at the lower surface 65D, and travels further downward than the lower surface 65D.

As shown in FIG. 7A, the light guide member 65 is placed such that part of the upper surface 65C from the light entering surface 65B to the light exiting surface 65A projects toward the optical axis LT with respect to the first holder 51 (the upper wall 51A) located above the light guide member 65 and such that the light reflected from the surface-to-be-read GA is made incident thereon and is transmitted therethrough. It is not necessary for the entire light guide member 65 to project toward the optical axis LT with respect to the first holder 51;

it suffices for at least part of the upper surface 65C from the light entering surface 65B to the light exiting surface 65A to project from an end portion 51C of the first holder 51 such that the light reflected from the surface-to-be-read GA is made incident thereon and is transmitted therethrough.

Next, the position of the end portion 51 of the first holder 51 will be described.

Figure 8:
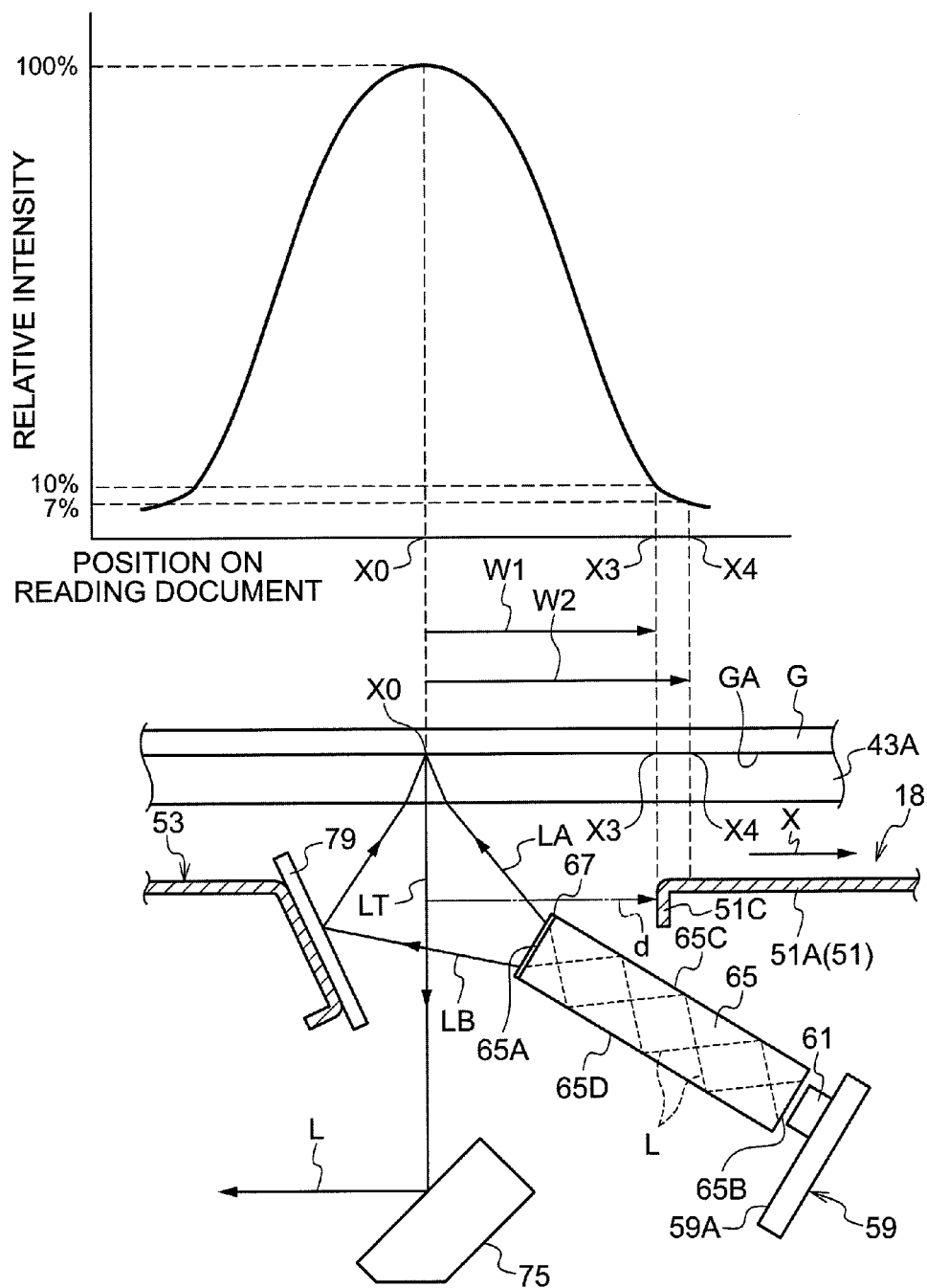
FIG. 8 is a cross-sectional diagram, in the slow scanning direction, of the main portion of the document reading device pertaining to the exemplary embodiment of the present invention and is a graph showing a relative intensity distribution of light in a reading position.

In FIG. 8, there are shown a cross-sectional diagram, in the slow scanning direction, of the first carriage 18 and a graph of results of calculating, by simulation, changes in the relative intensity, in the slow scanning direction, of the light L (including LA and LB) with which the surface-to-be-read GA of the reading document G is irradiated using a reading position X0 of the reading document G as a center.

In the graph of the intensity distribution of the light L in the slow scanning direction, the reading position X0 is the intensity distribution center, and the relative intensity drops the further away the position is in the slow scanning direction from the reading position X0. Here, when the relative intensity of the light L at the reading position X0 is 100% and a distance W1 from the reading position X0 to a position X3 where the relative intensity becomes 10% is calculated, W1=12 mm. Further, when a distance W2 from the reading position X0 to a position X4 where the relative intensity becomes 7% is calculated, W2=15 mm.

In the area where the relative intensity becomes equal to or greater than 10%, the intensity of the light L that has been reflected by the reading document G is high, so if the upper member were to be disposed inside this area (the area where the relative intensity becomes equal to or greater than 10%), re-reflection of the light would occur at the upper surface of the upper member and, as mentioned above, a drop in the luminance differences (contrast) of the image would arise in the photoelectric conversion element 26 (see FIG. 1). For this reason, in the first carriage 18 of the present exemplary embodiment, the distance (here, a horizontal distance d) from the optical axis LT passing through the reading position X0 to the end portion of the upper surface of the first holder 51 is set such that d=W1=12 mm. It is desirable for the horizontal distance d to be equal to or greater than 12 mm, but it is good for the horizontal distance d to be set such that d≧15 mm such that the relative intensity becomes equal to or less than 7%. The upper limit value of the horizontal distance d is decided on the basis of the area where the first holder 51 is installed in the first carriage 18.

On the reflector plate 79 side of the reading position X0 in the slow scanning direction, the reflector plate 79 is placed closer to the optical axis LT than the end portion 51C of the first holder 51, but because the attachment position of the reflector plate 79 is set on the basis of the state of reflection of light LB that has exited from the diffuser plate 67, the distance from the optical axis LT to the reflector plate 79 may also be within 12 mm.

Next, the traveling of the light L in the first carriage 18 will be described. Here, a case where the reading document G is on the first platen glass 43A will be described.

As shown in FIG. 7A, when the reading document G is placed on the first platen glass 43A and reading operation is started, the first carriage 18 moves in the slow scanning direction (the direction of arrow X) and the light emitting elements 61 emit light. Then, the light L that has been emitted from the light emitting elements L spreads at a predetermined angle of divergence and is made incident inside the light guide member 65 from the light entering surface 65B. Inside the light guide member 65, the light L travels at an angle that is larger than the critical angle, so the light L travels toward the light exiting surface 65A while being totally reflected by the upper surface 65C and the lower surface 65D.

Next, the light L that has exited from the light exiting surface 65A of the light guide member 65 is diffused by the diffuser plate 67 such that some of the light L travels toward the reading document G as light LA and such that the remainder of the light L travels toward the reflector plate 79 as light LB and is reflected by the reflector plate 79. The light LA and the light LB are respectively made incident on the first platen glass 43A and refracted such that the reading position X0 of the surface-to-be-read GA of the reading document G is irradiated therewith. The reading position X0 is the center position of the intensity distribution of the light L with which the reading document G has been irradiated and is located on the optical axis LT.

Next, of the light that has been reflected at the reading position X0 of the reading document G and has become diffused light, the light L traveling along the optical axis LT travels from the surface of the reading document G toward the first mirror 75 and is reflected by the first mirror 75. Then, as shown in FIG. 3, the light L travels from the second carriage 22 through the imaging-use lens 24 and is imaged at the photoelectric conversion element 26.

Next, the action of the present exemplary embodiment will be described.

First, the difference between the present exemplary embodiment and a first comparative example that uses a light guide member 202 having an upper surface 202A that reflects the light L will be described.

Figure 9A:
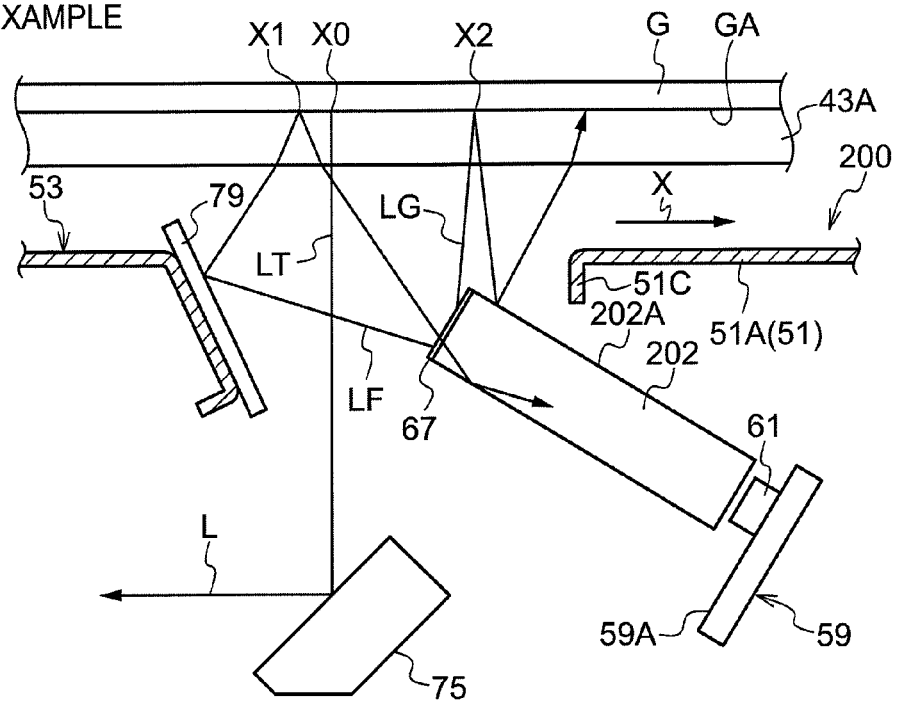
FIG. 9A is a schematic diagram showing a state of light travel in a main portion of a document reading device of a first comparative example.

In FIG. 9A, there is shown a first carriage 200 that is a first comparative example with respect to the first carriage 18 of the present exemplary embodiment. The first carriage 200 has the cuboid light guide member 202 that guides the light L that has been emitted from the light emitting elements 61 to the reading document G. The first carriage 200 is the same as the first carriage 18 of the present exemplary embodiment except that the light guide member 65 is replaced with the light guide member 202, so the same reference numerals will be given to the other members of the first carriage 200 and description of those other members will be omitted. Further, in order to make it easier to understand the reflection path of the light L, illustration of the optical path of the light L from the light emitting elements 61 to the reading position X0 is omitted.

The light guide member 202 totally reflects the light L inside, but the upper surface 202A positioned on the reading document G side is rougher than the surface of the light guide member 65 of the present exemplary embodiment and is opaque, so the light L that is made incident on the upper surface 202A is reflected.

Here, in the first carriage 200, the light L with which the reading position X0 has been irradiated is reflected by the reading document G and becomes diffused light. Of this diffused light L, the light L traveling toward the first mirror 75 along the optical axis LT is reflected by the first mirror 75. Further, the surface-to-be-read GA of the reading document G is irradiated with light LF that has exited from the diffuser plate 67 and has been reflected by the reflector plate 79, and the light LF is reflected at a reflection position X1 shifted toward the reflector plate 79 side from the reading position X0 in the direction of arrow X and becomes diffused light. Of this diffused light LF, the light traveling toward the diffuser plate 67 is transmitted through the diffuser plate 67 and enters the inside of the light guide member 202, but because it exits to the outside from the end surface of the light guide member 202 on the light emitting elements 61 side, it does not affect reading.

Some of the light L that exits from the light guide member 202 and is diffused by the diffuser plate 67 and travels directly toward the reading document G travels, like light LG, to a reflection position X2 shifted toward the light guide member 202 side from the reading position X0 in the direction of arrow X, is reflected at the reflection position X2 and becomes diffused light. Of this diffused light LG, the light LG traveling toward the upper surface 202A of the light guide member 202 is reflected by the upper surface 202A because the upper surface 202A is rough and opaque, and the surface-to-be-read GA of the reading document G is again irradiated therewith.

The light LG with which the reading document G has again been irradiated causes the intensity of the light (diffused light) reflected from the image on the reading document G is fluctuate and particularly causes the difference between the intensity of the light reflected from the background (white) of the reading document G and the intensity of the light reflected from the image (black) to drop in the margin of the black-painted portion of the image. Thus, in the image that has been photoelectrically converted by the photoelectric conversion element 26 (see FIG. 3), the luminance differences (contrast) between the background and the image of the reading document G drop, and a phenomenon arises where the outline of the image becomes blurry.

Figure 9B:
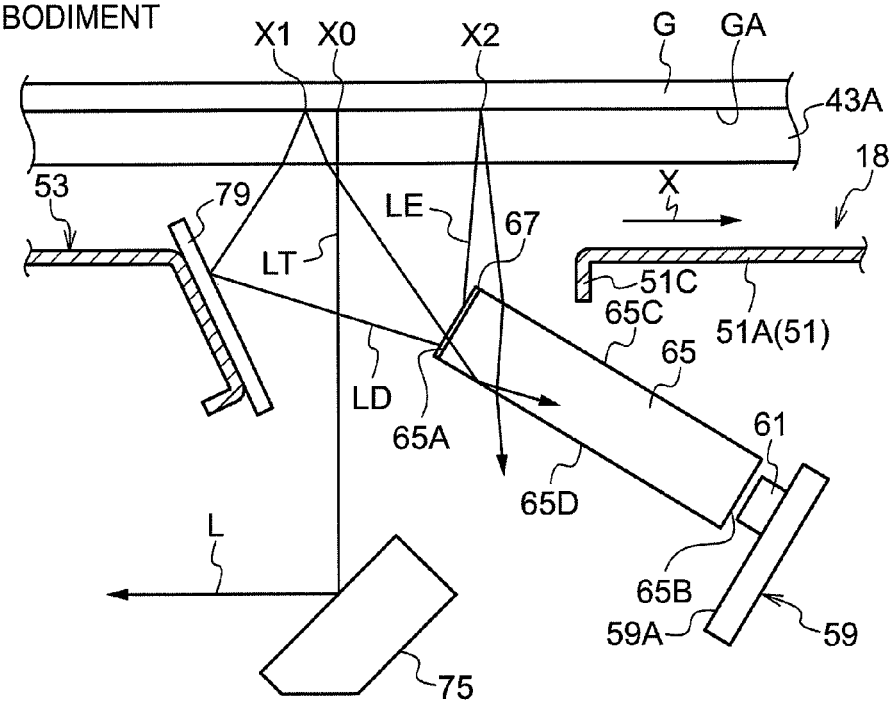
FIG. 9B is a schematic diagram showing a state of light travel in the main portion of the document reading device pertaining to the exemplary embodiment of the present invention.

Next, as shown in FIG. 9B, the first carriage 18 of the present exemplary embodiment will be described. In order to make it easier to understand the reflection path of the light L, illustration of the optical path of the light L from the light emitting elements 61 to the reading position X0 is omitted.

In the first carriage 18, as mentioned above, of the diffused light that has been reflected by the reading document G, the light L traveling toward the first mirror 75 along the optical axis LT is reflected by the first mirror 75. Further, the reading surface GA of the reading document G is irradiated with light LD that has exited from the diffuser plate 67 and has been reflected by the reflector plate 79, and the light LG is reflected at the reflection position X1 shifted toward the reflector plate 79 side from the reading position X0 in the direction of arrow X and becomes diffused light. Of this diffused light, the light LD traveling toward the diffuser plate 67 is transmitted through the diffuser plate 67 and enters the inside of the light guide member 65, but because it exits to the outside from the light entering surface 65B, it does not affect reading.

Some of the light L that exits from the light guide member 65 and is diffused by the diffuser plate 67 and travels directly toward the reading document G is, like light LE, reflected at the reflection position X2 shifted toward the light guide member 65 side from the reading position X0 in the direction of arrow X and becomes diffused light. Of this diffused light LE, the light LE traveling toward the upper surface 65C of the light guide member 65 is not reflected by the upper surface 65C because the light guide member 65 is transparent, the light LE is made incident on the upper surface 65C at a smaller angle than the critical angle, is refracted, is transmitted through the inside of the light guide member 65, and travels downward from the lower surface 65D. Thus, a situation where the surface-to-be-read GA of the reading document G is again irradiated with the light LE is suppressed, and fluctuations in the intensity of the light (diffused light) reflected from the image on the reading document G become smaller. Additionally, the drop in the luminance differences (contrast) of the image that has been photoelectrically converted by the photoelectric conversion element 26 (see FIG. 3) becomes smaller.

Next, the difference between the present exemplary embodiment and a second comparative example where the light guide member 65 is used and where an end portion 212A of a first holder 212 is moved closer to the optical axis LT will be described.

In FIG. 10A, there is shown a first carriage 210 that is the second comparative example with respect to the first carriage 18 of the present exemplary embodiment. The same reference numerals will be given to parts that are basically the same as those of the first carriage 200 (see FIG. 9A) that is the aforementioned first comparative example and description of those parts will be omitted. Further, in order to make it easier to understand the reflection path of the light L, illustration of the optical path of the light L from the light emitting elements 61 to the reading position X0 is omitted.

The first carriage 210 has a configuration that includes the light guide member 65 but where the first holder 212 is disposed instead of the first holder 51 of the first carriage 200 (see FIG. 9A). The first holder 212 is configured by sheet metal whose longitudinal direction coincides with the fast scanning direction, whose width direction coincides with the slow scanning direction (the direction of arrow X) and whose cross section in the slow scanning direction is L-shaped. Further, the upper surface of the first holder 212 forms the upper surface of the first carriage 210 and is placed opposing the reading document G, and the end portion 212A of the upper surface is folded downward.

In the first carriage 210, the horizontal distance d from the optical axis LT passing through the reading position X0 to the end portion 212A of the upper surface of the first holder 212 is such that d=W3=9 mm. In other words, the end portion 212A of the upper surface of the first holder 212 is closer to the reading position X0 in comparison to the end portion 51C of the upper surface of the first holder 51 of the present exemplary embodiment.

Here, in the first carriage 210, the light L with which the reading position X0 has been irradiated is reflected by the reading document G and becomes diffused light. Of this diffused light L, the light L traveling toward the first mirror 75 along the optical axis LT is reflected by the first mirror 75.

Of the light L that exits from the light guide member 65 and is diffused by the diffuser plate 67 and travels directly to the reading document G, light LH that has exited at a larger angle of diffusion than the angle of diffusion of the light LG (see FIG. 9A) is reflected at a reading position X5 shifted toward the side further away from the optical axis LT than the reading position X2 (see FIG. 9A) in the direction of arrow X and becomes diffused light. This diffused light LH is reflected by the upper surface of the first holder 212 because the first holder 212 is placed closer to the light guide member 65, and the surface-to-be-read GA of the reading document G is again irradiated therewith. Thus, the difference between the intensity of the light reflected from the background (white) of the reading document G and the intensity of the light reflected from the image (black) drops, the luminance differences (contrast) between the background and the image of the reading document G drop, and a phenomenon arises where the outline of the image becomes blurry.

Next, as shown in FIG. 10B, the first carriage 18 of the present exemplary embodiment will be described. In order to make it easier to understand the reflection path of the light L, illustration of the optical path of the light L from the light emitting elements 61 to the reading position X0 is omitted.

In the first carriage 18, as mentioned above, of the diffused light that has been reflected by the reading document G, the light L traveling toward the first mirror 75 along the optical axis LT is reflected by the first mirror 75. Further, of the light L that exits from the light guide member 65 and is diffused by the diffuser plate 67 and travels directly toward the reading document G, light LK that has exited at a larger angle of diffusion than the angle of diffusion of the light LE (see FIG. 9B) is reflected at the reading position X5 shifted further toward the outside than the reading position X2 (see FIG. 9B) in the reading direction X and becomes diffused light. Here, the first holder 51 is not placed in a range from the reading position X0 to the position X3 where the relative intensity of the light L is larger than 10%, so the first holder 51 is not irradiated with the diffused light LK, and the diffused light LK is made incident on the upper surface 65C of the light guide member 65 at a smaller angle than the critical angle, is refracted, is transmitted through the inside of the light guide member 65, and travels downward from the lower surface 65D.

Even if some of the diffused light LK were to reach the upper surface of the first holder 51, the intensity of the light that would be reflected by the upper surface of the first holder 51 and with which the surface-to-be-read GA would be irradiated would become small enough so as to virtually not affect the reading of the reading document G because the first holder 51 is placed in a range where the relative intensity of the light L becomes equal to or less than 10%.

In this manner, in the first carriage 18 of the present exemplary embodiment, a situation where the surface-to-be-read GA of the reading document G is again irradiated with the light LK is suppressed, and fluctuations in the intensity of the light (diffused light) reflected from the image on the reading document G become smaller. Additionally, the drop in the luminance differences (contrast) of the image that has been photoelectrically converted by the photoelectric conversion element 26 (see FIG. 3) becomes smaller.

Further, in the first carriage 18 of the present exemplary embodiment, the quantity of light with which the surface-to-be-read GA of the reading document G is again irradiated decreases as a result of moving the position of the end portion 51C of the first holder 51 away from the optical axis LT, so there is no longer the need to administer a surface treatment to suppress light reflection to the upper surface of the first holder 51, and the configuration becomes inexpensive in comparison when a holder to which a surface treatment has been administered is used.

The present invention is not limited to the above-described exemplary embodiment.

Figure 11:
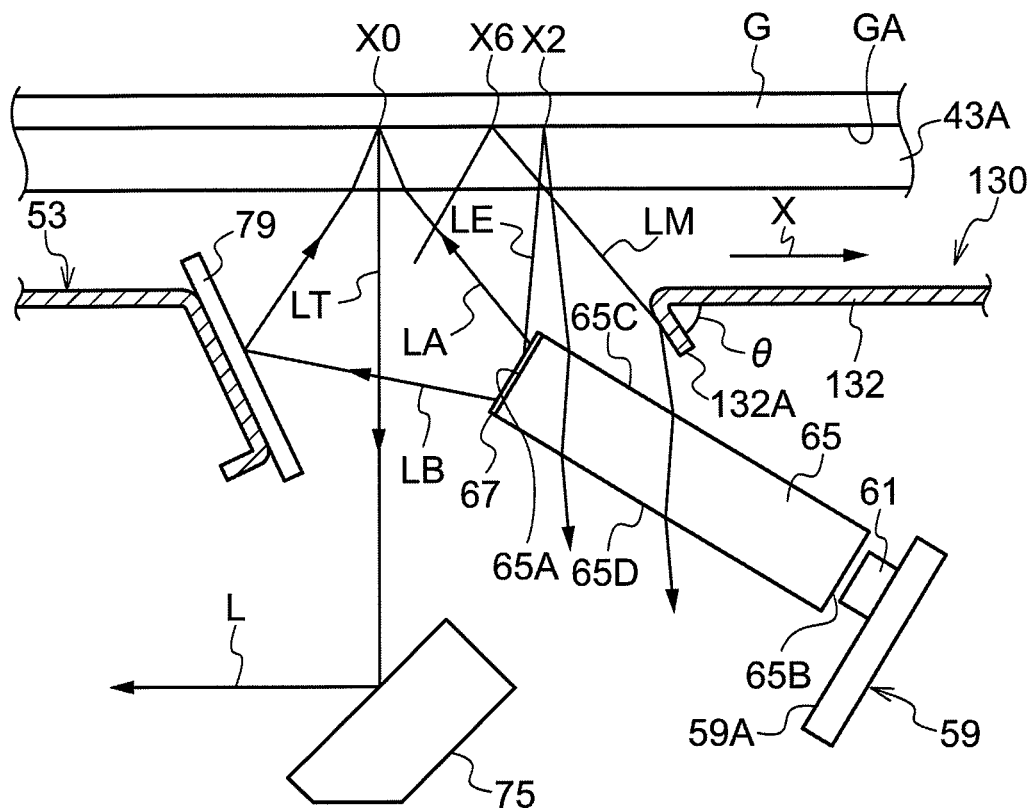
FIG. 11 is a partial cross-sectional diagram of a main portion of a document reading device pertaining to a modification of the exemplary embodiment of the present invention.

As shown in FIG. 11, a first carriage 130 having a first holder 132 in which a bent portion 132A is formed may also be used. The bent portion 132A is a site where the end portion of the upper surface is bent in an acute angle (an angle of inclination θ) downward with respect to the horizontal plane. Here, in the first carriage 130, light LM that has been reflected at a reflection position X6 located on the reading position X0 side of the reflection position X2 is reflected by the bent portion 132A, travels to the light guide member 65, and is transmitted through the inside of the light guide member 65. In this manner, a light guide member that guides the reflected light LM toward the light guide member 65 may also be disposed.

Further, the first carriage 18 may also be a carriage where there is no first holder 51 above the light guide member 65 and where the entire light guide member 65 is exposed.

As other materials of the light guide member 65, a resin material that totally reflects light and whose light transmittance is equal to or greater than 80% may also be used in addition to using polycarbonate resin, polyimide resin, glass, etc. Further, the present exemplary embodiment is not limited to reading of the reading document G on the first platen glass 43A and may also be applied to reading on the second platen glass 43B.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a plurality of light sources that are arranged in a row and emit light;
   a light guide body that guides the light emitted from the plurality of light sources to a reading portion and transmits light reflected from the reading portion, a surface roughness of an upper surface of the light guide body being equal to or less than 0.1 μm in terms of surface roughness measured by the arithmetic mean roughness Ra of JIS-B-0601;
   a carriage having the plurality of light sources and the light guide body; and
   a reading unit that receives the light reflected from the reading portion and reads an image on the reading portion.

2. The image reading device according to claim 1, wherein at least part of the light guide body projects toward an optical axis of an optical path which guides the light reflected from the reading portion to the reading unit more than an upper member, the upper member being a part of the carriage and being located above the light guide body.

3. The image reading device according to claim 2, wherein a horizontal distance from the optical axis to an end portion of the upper member on the optical axis side is equal to or greater than 12 mm.

4. The image reading device according to claim 1, wherein the light guide body is transparent.

5. An image forming apparatus comprising:
   the image reading device according to claim 1; and
   an image forming component that forms an image on the basis of information of an image read by the reading unit of the image reading device.

6. An image reading device comprising:
   a plurality of light sources that are arranged in a row and emit light;
   a light guide body that guides the light emitted from the plurality of light sources to a reading portion and transmits light reflected from the reading portion;
   a carriage having the plurality of light sources and the light guide body; and
   a reading unit that receives the light reflected from the reading portion and reads an image on the reading portion, wherein
   at least part of the light guide body projects toward an optical axis of an optical path which guides the light reflected from the reading portion to the reading unit more than an upper member, the upper member being a part of the carriage and being located above the light guide body, and
   wherein a horizontal distance from the optical axis to an end portion of the upper member on the optical axis side is equal to or greater than 12 mm.

\* \* \* \* \*